United States Patent
Reddington et al.

(10) Patent No.: US 9,659,266 B2
(45) Date of Patent: May 23, 2017

(54) ENTERPRISE INTELLIGENCE ('EI') MANAGEMENT IN AN EI FRAMEWORK

(75) Inventors: Francis X. Reddington, Sarasota, FL (US); Neil Sahota, Costa Mesa, CA (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 13/182,684

(22) Filed: Jul. 14, 2011

(65) Prior Publication Data

US 2013/0018801 A1   Jan. 17, 2013

(51) Int. Cl.
*G06Q 10/06* (2012.01)

(52) U.S. Cl.
CPC .................... *G06Q 10/06* (2013.01)

(58) Field of Classification Search
USPC ......................................... 705/301
See application file for complete search history.

(56) References Cited

U.S. PATENT DOCUMENTS

| | | |
|---|---|---|
| 5,067,099 A | 11/1991 | McCown |
| 5,301,320 A | 4/1994 | McAtee et al. |
| 5,630,069 A | 5/1997 | Flores et al. |
| 5,734,837 A | 3/1998 | Flores et al. |
| 5,745,901 A | 4/1998 | Entner et al. |
| 5,890,133 A | 3/1999 | Ernst |
| 6,041,306 A | 3/2000 | Du |
| 6,278,977 B1 | 8/2001 | Agrawal |
| 6,529,909 B1 | 3/2003 | Bowman-Amuah |
| 6,601,233 B1 | 7/2003 | Underwood |
| 6,662,355 B1 | 12/2003 | Caswell |
| 6,757,689 B2 | 6/2004 | Battas et al. |
| 6,763,353 B2 | 7/2004 | Li |
| 6,847,892 B2 | 1/2005 | Zhou et al. |
| 7,213,232 B1 | 5/2007 | Knowles |
| 7,221,377 B1 | 5/2007 | Okita et al. |
| 7,441,249 B2 | 10/2008 | Adachi et al. |
| 7,711,704 B2 | 5/2010 | Azizi |
| 7,712,032 B2 | 5/2010 | Breedvelt-Schouten et al. |
| 7,714,878 B2 | 5/2010 | Gabay et al. |
| 7,716,066 B2 | 5/2010 | Rosow et al. |
| 7,716,107 B1 | 5/2010 | Variankaval et al. |

(Continued)

FOREIGN PATENT DOCUMENTS

| | | |
|---|---|---|
| CN | 101149821 A | 3/2008 |
| CN | 101159047 A | 4/2008 |
| CN | 101266661 A | 9/2008 |

OTHER PUBLICATIONS

Office Action, U.S. Appl. No. 13/182,684, Aug. 13, 2013, pp. 1-13.

(Continued)

*Primary Examiner* — Thomas L Mansfield, Jr.
(74) *Attorney, Agent, or Firm* — Brandon C. Kennedy; John R. Pivnichny; Kennedy Lenart Spraggins LLP

(57) ABSTRACT

Enterprise Intelligence ('EI') management in an EI framework including: analyzing, by an assembly analysis engine, a plurality of EI assemblies, each EI assembly configured to carry out a business capability upon execution; choreographing, by an assembly engine, execution of one or more of the EI assemblies; and reporting, by the assembly engine to an EI administrator, information related to execution of the one or more of the EI assemblies.

15 Claims, 8 Drawing Sheets

(56) References Cited

U.S. PATENT DOCUMENTS

| | | | |
|---|---|---|---|
| 7,716,167 B2 | 5/2010 | Colossi et al. | |
| 7,716,212 B2 | 5/2010 | Azizi et al. | |
| 7,716,233 B2 | 5/2010 | Xiong | |
| 7,716,257 B2 | 5/2010 | Thomson et al. | |
| 7,716,530 B2 | 5/2010 | Verbowski et al. | |
| 7,716,571 B2 | 5/2010 | Tien et al. | |
| 7,716,592 B2 | 5/2010 | Tien et al. | |
| 7,720,674 B2 | 5/2010 | Kaiser et al. | |
| 7,720,695 B2 | 5/2010 | Rosow et al. | |
| 7,720,782 B2 | 5/2010 | Chaudhury et al. | |
| 7,720,789 B2 | 5/2010 | Seeds et al. | |
| 7,720,804 B2 | 5/2010 | Fazal et al. | |
| 7,720,808 B2 | 5/2010 | Lin et al. | |
| 7,720,831 B2 | 5/2010 | Yang et al. | |
| 7,720,835 B2 | 5/2010 | Ward et al. | |
| 7,720,846 B1 | 5/2010 | Bayliss | |
| 7,720,848 B2 | 5/2010 | Guerraz et al. | |
| 7,720,861 B1 | 5/2010 | Vasudevan | |
| 7,720,863 B2 | 5/2010 | Fifield et al. | |
| 7,721,189 B2 | 5/2010 | Breedvelt-Schouten et al. | |
| 7,725,334 B2 | 5/2010 | Wahlbin et al. | |
| 7,725,728 B2 | 5/2010 | Ama et al. | |
| 7,730,023 B2 | 6/2010 | MacGregor | |
| 7,730,057 B2 | 6/2010 | Bell et al. | |
| 7,730,061 B2 | 6/2010 | Gruhl et al. | |
| 7,730,063 B2 | 6/2010 | Eder | |
| 7,730,085 B2 | 6/2010 | Hassan et al. | |
| 7,730,198 B2 | 6/2010 | Ruppert et al. | |
| 7,730,446 B2 | 6/2010 | Anonsen et al. | |
| 7,730,528 B2 | 6/2010 | Chun et al. | |
| 7,733,799 B2 | 6/2010 | Kalliola et al. | |
| 7,734,479 B2 | 6/2010 | Rosow et al. | |
| 7,734,556 B2 | 6/2010 | Tan et al. | |
| 7,734,560 B2 | 6/2010 | Seeger et al. | |
| 7,734,576 B2 | 6/2010 | Simon et al. | |
| 7,734,629 B2 | 6/2010 | Chakrabarti et al. | |
| 7,734,900 B2 | 6/2010 | Farrell et al. | |
| 7,737,857 B2 | 6/2010 | Ebert et al. | |
| 7,738,488 B2 | 6/2010 | Marsico et al. | |
| 7,739,136 B2 | 6/2010 | Chang et al. | |
| 7,739,202 B2 | 6/2010 | Kadaba | |
| 7,739,224 B1 | 6/2010 | Weissman et al. | |
| 7,739,275 B2 | 6/2010 | Dubinko et al. | |
| 7,739,434 B2 | 6/2010 | Farrell et al. | |
| 7,743,071 B2 | 6/2010 | Yang et al. | |
| 7,783,724 B2 | 8/2010 | Winter et al. | |
| 8,024,275 B2 | 9/2011 | Stone | |
| 8,200,527 B1* | 6/2012 | Thompson et al. | 705/7.39 |
| 8,392,240 B2 | 3/2013 | Vaidhyanathan et al. | |
| 8,429,668 B2 | 4/2013 | Kowalkiewicz et al. | |
| 2001/0025247 A1 | 9/2001 | Nagai | |
| 2001/0044738 A1 | 11/2001 | Elkin et al. | |
| 2002/0026297 A1 | 2/2002 | Leymann | |
| 2002/0065673 A1 | 5/2002 | Rooke | |
| 2002/0099585 A1 | 7/2002 | Locke | |
| 2002/0107957 A1* | 8/2002 | Zargham et al. | 709/224 |
| 2002/0116362 A1 | 8/2002 | Li | |
| 2002/0144233 A1* | 10/2002 | Chong et al. | 717/105 |
| 2002/0165745 A1 | 11/2002 | Greene et al. | |
| 2002/0165903 A1 | 11/2002 | Zargham et al. | |
| 2002/0194042 A1 | 12/2002 | Sands | |
| 2003/0018402 A1 | 1/2003 | Breunese | |
| 2003/0093762 A1 | 5/2003 | Rietman | |
| 2003/0171947 A1* | 9/2003 | Ledford et al. | 705/1 |
| 2003/0187984 A1 | 10/2003 | Banavar et al. | |
| 2003/0195782 A1 | 10/2003 | Sakaguchi | |
| 2004/0078105 A1 | 4/2004 | Moon et al. | |
| 2004/0122699 A1 | 6/2004 | Brito et al. | |
| 2004/0181775 A1 | 9/2004 | Anonsen et al. | |
| 2004/0225546 A1 | 11/2004 | Oberdorfer | |
| 2005/0197969 A1 | 9/2005 | McElroy et al. | |
| 2006/0064335 A1 | 3/2006 | Goldszmidt et al. | |
| 2006/0074725 A1 | 4/2006 | Huang et al. | |
| 2006/0129978 A1 | 6/2006 | Abrari et al. | |
| 2006/0224702 A1 | 10/2006 | Schmidt et al. | |
| 2006/0229925 A1 | 10/2006 | Chalasani | |
| 2007/0006177 A1 | 1/2007 | Aiber et al. | |
| 2007/0043632 A1* | 2/2007 | Abelow | G06Q 10/101 705/26.8 |
| 2007/0100841 A1 | 5/2007 | Elkin et al. | |
| 2007/0100884 A1 | 5/2007 | Brown et al. | |
| 2007/0136355 A1* | 6/2007 | Haider | 707/102 |
| 2007/0150430 A1 | 6/2007 | Campbell et al. | |
| 2007/0265895 A1 | 11/2007 | Moore | |
| 2007/0299937 A1 | 12/2007 | Winter et al. | |
| 2008/0077530 A1 | 3/2008 | Banas et al. | |
| 2008/0140474 A1 | 6/2008 | Yu et al. | |
| 2008/0209029 A1 | 8/2008 | Bhattacharya | |
| 2008/0215389 A1 | 9/2008 | Heidasch | |
| 2008/0215404 A1 | 9/2008 | Diao et al. | |
| 2008/0312979 A1* | 12/2008 | Lee et al. | 705/7 |
| 2008/0313110 A1 | 12/2008 | Kreamer et al. | |
| 2008/0320486 A1 | 12/2008 | Bose et al. | |
| 2009/0094269 A1 | 4/2009 | Behnen | |
| 2009/0150125 A1 | 6/2009 | Elaasar | |
| 2009/0198481 A1 | 8/2009 | Narayanaswamy et al. | |
| 2009/0198533 A1 | 8/2009 | Narayanaswamy et al. | |
| 2009/0198639 A1 | 8/2009 | Narayanaswamy et al. | |
| 2009/0210364 A1 | 8/2009 | Adi | |
| 2009/0276692 A1 | 11/2009 | Rosner | |
| 2010/0235842 A1 | 9/2010 | Tamura | |
| 2010/0291965 A1* | 11/2010 | Tabe | H04M 1/6083 455/550.1 |
| 2010/0306000 A1 | 12/2010 | Green et al. | |
| 2010/0317420 A1* | 12/2010 | Hoffberg | 463/1 |
| 2011/0004885 A1 | 1/2011 | Kikuchi | |
| 2011/0145518 A1 | 6/2011 | Balko et al. | |
| 2012/0053986 A1* | 3/2012 | Cardno | G06Q 30/0201 705/7.29 |
| 2012/0110055 A1 | 5/2012 | Van Biljon et al. | |
| 2012/0185913 A1* | 7/2012 | Martinez | G06F 9/455 726/1 |
| 2012/0330869 A1 | 12/2012 | Durham | |
| 2013/0018682 A1 | 1/2013 | Reddington et al. | |
| 2013/0018695 A1 | 1/2013 | Reddington et al. | |
| 2013/0018801 A1 | 1/2013 | Reddington et al. | |
| 2013/0018815 A1 | 1/2013 | Reddington et al. | |
| 2013/0018910 A1 | 1/2013 | Reddington et al. | |
| 2013/0019246 A1 | 1/2013 | Reddington et al. | |

OTHER PUBLICATIONS

Final Office Action, U.S. Appl. No. 13/182,711, Jul. 22, 2013, pp. 1-5.
Office Action, U.S. Appl. No. 13/182,711, Apr. 4, 2013, pp. 1-11.
Office Action, U.S. Appl. No. 13/182,730, Sep. 10, 2013, pp. 1-12.
Final Office Action, U.S. Appl. No. 13/182,752, Jun. 14, 2013, pp. 1-12.
Office Action, U.S. Appl. No. 13/182,752, Jan. 4, 2013, pp. 1-13.
Office Action, U.S. Appl. No. 13/182,769, Oct. 1, 2013, pp. 1-15.
Notice of Allowance, U.S. Appl. No. 13/182,802, Jun. 14, 2013, pp. 1-6.
Office Action, U.S. Appl. No. 13/182,802, Jan. 4, 2013, pp. 1-13.
Office Action, U.S. Appl. No. 13/182,752, Feb. 26, 2015, pp. 1-16.
Muehlen, et al., "Workflow-based Process Monitoring and Controlling-Technical and Organizational Issues", Proceedings of the 33rd Annual Hawaii International Conference on System Sciences (HICSS-33), Jan. 2000, 10 pages, IEEE Xplore Digital Library (online), URL: https://www.computer.org/csdl/proceedings/hicss/2000/0493/06/04936032.pdf.
Sayal, et al. "Business Process Cockpit", Proceedings of the 28th International Conference on Very Large Data Bases, Aug. 2002, pp. 880-83, VLDB Endowment, ACM Digital Library (online, acm.org).
Grigori, et al. "Improving Business Process Quality Through Exception Understanding, Prediction, and Prevention", Proceedings of the 27th International Conference on Very Large Data Bases (VLDB '01), Sep. 2001, pp. 159-168, vol. 1, Morgan Kaufmann Publishers Inc., San Francisco, CA.

* cited by examiner

ENTERPRISE INTELLIGENCE ('EI') MANAGEMENT IN AN EI FRAMEWORK

BACKGROUND OF THE INVENTION

Field of the Invention

The field of the invention is data processing, or, more specifically, methods, apparatus, and products for Enterprise Intelligence ('EI') management in an EI framework.

Description of Related Art

Companies and organizations are continually looking new opportunities for revenue growth or cost reduction. In today's environment, clients have plucked the low hanging fruit and are searching for additional opportunities for revenue growth or cost reduction. Companies often fail to make insightful decisions about significant changes in their business and markets. With a wealth of data available, clients need a solid framework to identify and develop these opportunities that are driven by business needs.

SUMMARY OF THE INVENTION

Enterprise Intelligence ('EI') management in an EI framework including: choreographing, by an assembly engine, execution of a plurality of EI assemblies, each EI assembly configured to carry out a business capability upon execution; and reporting, by the assembly engine to an EI administrator, information related to execution of the EI assemblies.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for Enterprise Intelligence management in an Enterprise Intelligence framework (120) in accordance with the present invention are described with reference to the accompanying drawings, beginning with FIG. 1. Enterprise Intelligence represents the knowledge base of a business enterprise such as a corporation. Enterprise Intelligence can include any information related to an enterprise's capabilities, information related to the markets that an enterprise operates within, and so on. Enterprise Intelligence can be managed through the use an Enterprise Intelligence ('EI') framework. The EI framework (120) provides a system that will allow enterprises to identify and develop business, system, and operational intelligence opportunities, as well as develop enterprise capabilities. The EI framework (120) includes automated computing machinery that store and execute computer program instructions. For further explanation, therefore, FIG. 1 sets forth a block diagram of automated computing machinery comprising exemplary computers (152, 183, 185, 187, 189, 191) useful in EI management according to embodiments of the present invention. Although only one computer (152) is shown in great detail, readers will appreciate that the other computers (183, 185, 187, 189, 191) may also include all of the computing devices contained in computer (152).

Figure 1:
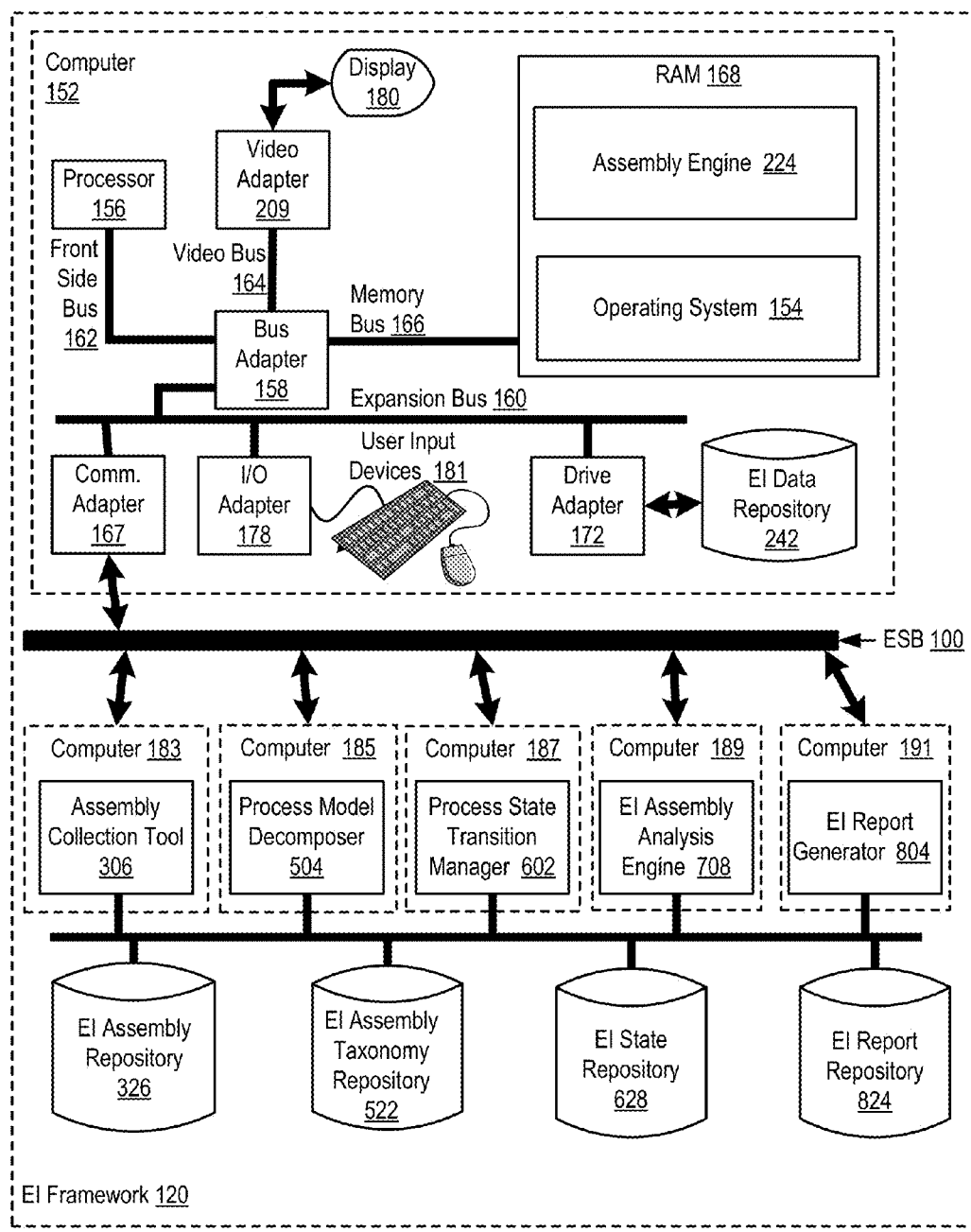
FIG. 1 sets forth a block diagram of automated computing machinery comprising exemplary computers useful in EI management according to embodiments of the present invention.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an operating system (154). Operating systems useful EI management according to embodiments of the present invention include UNIX™, Linux™, Microsoft XP™, AIX™, IBM's i5/OS™, and others as will occur to those of skill in the art.

Also stored in RAM (168) is an assembly engine (224), a module of computer program instructions for managing one or more assemblies. An EI assembly is a module of computer program instructions configured to carry out a business capability. Such business capabilities may include, for example, an accounting function such as cost accounting, inventory related functions such as inventory management, personnel related functions such as salary administration, and other functions that may be specifically tailored to the operations of a particular business entity. Each business capability may include one or more processes that perform one or more functions. The assembly engine (224) may be configured, for example, to manage communications between assemblies, to provide access to physical resources upon which the assemblies can execute, to schedule the execution of one or more assemblies, and so on. In the example of FIG. 1, the assembly engine (224) is configured to choreograph execution of a plurality of EI assemblies and report information related to execution of the EI assemblies. The operating system (154) and assembly engine (224) in the example of FIG. 1 are shown in RAM (168), but many components of such software typically are stored in non-volatile memory also, such as, for example, on a disk drive.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of an EI data repository (242) stored on a disk drive. Disk drive adapters useful in computers for EI management according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (183, 185, 187, 189, 191) and for data communications with an enterprise service bus (100). In the example of FIG. 1, the enterprise service bus (100) is a data communications pathway through which all components of the EI framework (120) may carry out data communications. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for EI management according to embodiments of the present invention include modems for wired dial-up communications, Ethernet (IEEE 802.3) adapters for wired data communications network communications, and 802.11 adapters for wireless data communications network communications.

The EI framework of FIG. 1 includes an additional computer (183). The additional computer (183), while depicted in less detail, can include all of the computing machinery illustrated in computer (152). The computer (183) also includes an assembly collection tool (306). In the example of FIG. 1, the assembly collection tool (306) may be embodied, for example, as a module of computer program instructions that, when executed, manages a collection of assemblies in the EI framework (120). The assembly collection tool (306) may manage a collection of assemblies in the EI framework (120) by identifying one or more processes for inclusion in a specification of an assembly. The assembly collection tool (306) may further manage a collection of assemblies in the EI framework (120) by identifying for each process one or more tasks that comprise the process. The assembly collection tool (306) may further manage a collection of assemblies in the EI framework (120) by identifying for each task one or more steps that comprise the task. The assembly collection tool (306) may further manage a collection of assemblies in the EI framework (120) by identifying a sequence for executing the steps, tasks, and processes in the assembly. The assembly collection tool (306) may further manage a collection of assemblies in the EI framework (120) by generating, in dependence upon the identified processes, tasks, steps, and sequence, the specification of the assembly. The assembly collection tool (306) may further manage a collection of assemblies in the EI framework (120) by storing the specification in an EI assembly repository (326).

The EI framework of FIG. 1 includes an additional computer (185). The additional computer (185), while depicted in less detail, can include all of the computing machinery illustrated in computer (152). The computer (185) also includes a process model decomposer (504). In the example of FIG. 1, the process model decomposer (504) may be embodied, for example, as a module of computer program instructions that, when executed, decompose a process in the EI framework (120). The process model decomposer (504) may decompose a process in the EI framework (120) by receiving a process model for an EI assembly. The process model decomposer (504) may further decompose a process in the EI framework (120) by identifying, by the process model decomposer in dependence upon an EI framework metamodel, component parts of the process model. The process model decomposer (504) may further decompose a process in the EI framework (120) by generating, in dependence upon the identified component parts, a taxonomy breakdown comprising a definition of a process classification. In the example of FIG. 1, the taxonomy breakdown may be stored in an EI assembly taxonomy repository (522).

The EI framework of FIG. 1 includes an additional computer (187). The additional computer (187), while depicted in less detail, can include all of the computing machinery illustrated in computer (152). The computer (187) also includes a process state transition manager (602). In the example of FIG. 1, the process state transition manager (602) may be embodied, for example, as a module of computer program instructions that, when executed, manages processes in the EI framework (120). The process state transition manager (602) may manage processes in the EI framework (120) by tracking the present state of processes of each executing EI assembly. The process state transition manager (602) may further manage processes in the EI framework (120) by analyzing the present state. The process state transition manager (602) may manage processes in the EI framework (120) by storing results of the state analysis. The results of the state analysis may be stored, for example, in an EI state repository (628).

The EI framework of FIG. 1 includes an additional computer (189). The additional computer (189), while depicted in less detail, can include all of the computing machinery illustrated in computer (152). The computer (189) also includes an EI assembly analysis engine (708). In the example of FIG. 1, the EI assembly analysis engine (708) may be embodied, for example, as a module of computer program instructions that, when executed, analyzes assemblies in the EI framework (120). The EI assembly analysis engine (708) analyzes assemblies in the EI framework (120) by determining the present execution state of an EI assembly. The EI assembly analysis engine (708) further analyzes assemblies in the EI framework (120) by determining the ideal execution state for the EI assembly. The EI assembly analysis engine (708) analyzes assemblies in the EI framework (120) by identifying differences between the present execution state of the EI assembly and the ideal execution state for the EI assembly.

The EI framework of FIG. 1 includes an additional computer (191). The additional computer (191), while depicted in less detail, can include all of the computing machinery illustrated in computer (152). The computer (183) also includes an EI report generator (804). In the example of FIG. 1, the EI report generator (804) may be embodied, for example, as a module of computer program instructions that, when executed, carries out EI reporting in an EI framework (120). The EI report generator (804) carries out EI reporting in an EI framework (120) by identifying EI report criteria for inclusion in an EI report. The EI report generator (804) further carries out EI reporting in an EI framework (120) by extracting EI report information that meets the EI report criteria from an EI data repository (242). The EI report generator (804) further carries out EI reporting in an EI framework (120) by assembling the EI report information into an EI report. The EI report generator (804) further carries out EI reporting in an EI framework (120) by presenting the EI report to an EI administrator and storing the EI report in an EI report repository (824).

In the example of FIG. 1, the assembly collection tool (306), process model decomposer (504), process state transition manager (602), EI assembly analysis engine (708), and EI report generator (804) are illustrated as residing on multiple computers. Readers will appreciate that the assembly collection tool (306), process model decomposer (504), process state transition manager (602), EI assembly analysis engine (708), and EI report generator (804) may reside on a single computer or multiple computers.

In the example of FIG. 1, the EI data repository (242), EI assembly repository (326), EI assembly taxonomy repository (522), EI state repository (628), and EI report repository (824) are illustrated as residing on multiple storage devices. Readers will appreciate that the EI data repository (242), EI assembly repository (326), EI assembly taxonomy repository (522), EI state repository (628), and EI report repository (824) may reside on a single storage device or multiple storage devices.

Figure 2:
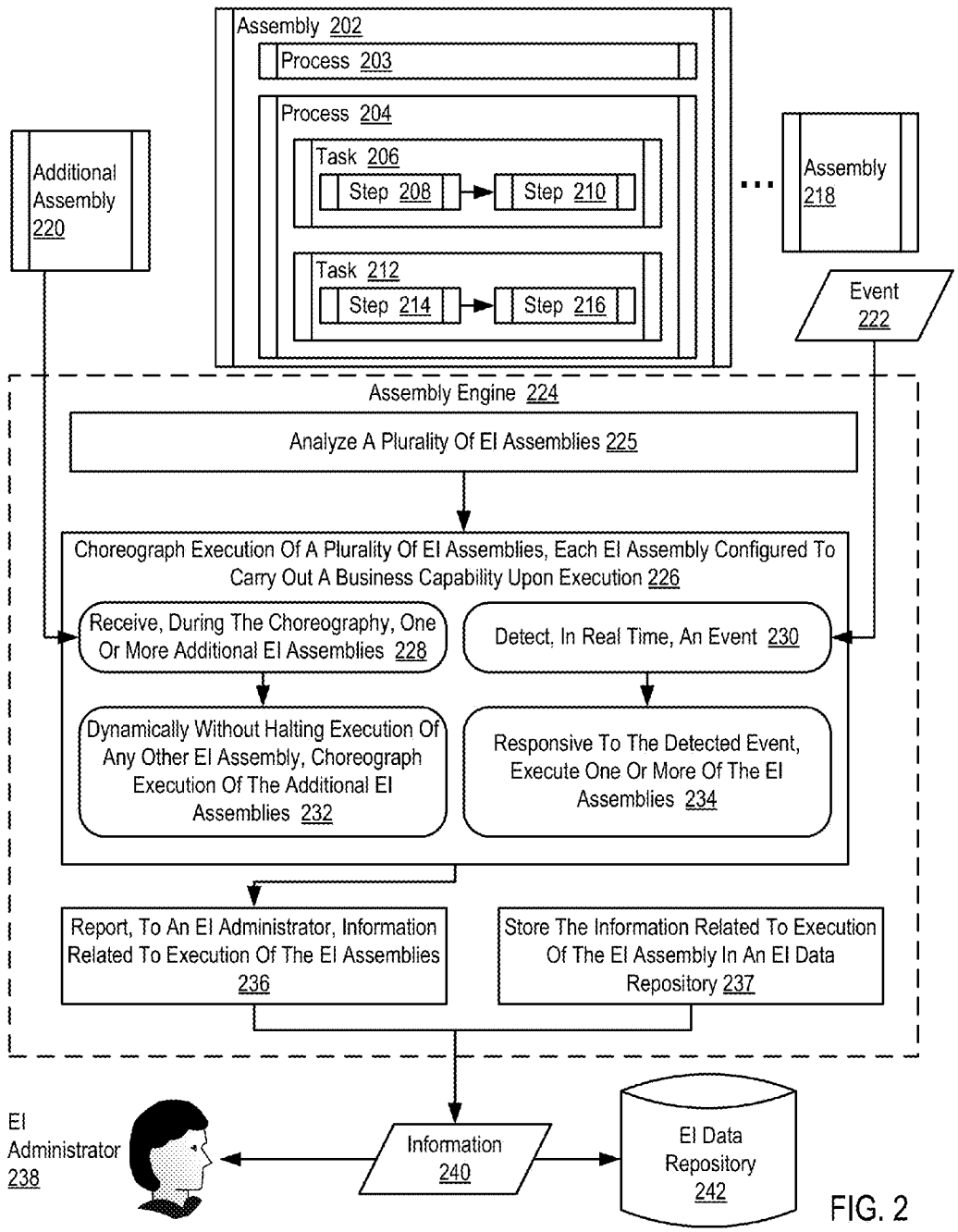
FIG. 2 sets forth a flow chart illustrating an exemplary method for EI management in an EI framework according to embodiments of the present invention.

For further explanation of assembly engine operation, FIG. 2 sets forth a flow chart illustrating an exemplary method for EI management in an EI framework according to embodiments of the present invention. The example method of FIG. 2 includes analyzing (225), by an assembly analysis engine (224), a plurality of EI assemblies (202, 218, 220). In the example method of FIG. 2, each EI assembly (202, 218, 220) is configured to carry out a business capability—or 'business function'—upon execution. Each EI assembly (202, 218, 220) may be embodied as computer program instructions that, when executed, carry out a particular business function. Such business functions may include, for example, an accounting function such as cost accounting, inventory related functions such as inventory management, personnel related functions such as salary administration, and other functions that may be specifically tailored to the operations of a particular business entity.

In the example method of FIG. 2, analyzing (225) a plurality of EI assemblies (202, 218, 220) may include identifying the particular business capabilities that a particular EI assembly can carry out, by identifying the particular business capabilities that a combination of EI assemblies can carry out, and so on. Furthermore, in the example method of FIG. 2, analyzing (225) a plurality of EI assemblies (202, 218, 220) may include identifying the resources necessary to execute a particular EI assembly or a combination of EI assemblies. Examples of resources necessary to execute a particular EI assembly or a combination of EI assemblies can include, for example, computing equipment, human resources, or other automated equipment that is needed to execute a particular EI assembly or a combination of EI assemblies.

By analyzing (225) the EI assemblies that are included in an EI framework, the EI framework can provide a comprehensive Enterprise Intelligence system and identify business and system related needs. The EI framework may also be capable of providing a readiness assessment and key performance indicators and metrics may be identified. Likewise, an Enterprise Intelligence decision-making framework can be created to resolve operational problems and identify business opportunities, as well as perform other functions to provide a robust and comprehensive EI framework.

In the example method of FIG. 2, analyzing (225) a plurality of EI assemblies (202, 218, 220) is carried out by an assembly engine (224). The assembly engine (224) of FIG. 2 may be embodied as a module of automated computing machinery designed to manage one or more assemblies (202, 218, 220). The assembly engine (224) may be configured, for example, to manage communications between assemblies (202, 218, 220), to provide access to physical resources upon which the assemblies (202, 218, 220) can execute, to schedule the execution of one or more assemblies (202, 218, 220), and so on.

In the example method of FIG. 2, each EI assembly (202, 218, 220) can include one or more processes (203, 204) ordered in accordance with a specified sequence. In the example method of FIG. 2, a process (203, 204) represents a sub-component of an EI assembly (202, 218, 220). Each process (203, 204) may be embodied as computer program instructions that, when executed, carry out one part of a business function that is carried out by the entire EI assembly (202, 218, 220). For example, an EI assembly that generates an invoice may be composed of multiple processes that extract invoicing information for different services offered by the business entity. Consider an example in which the business entity is a television service provider. In such an example, a first process may extract information identifying the number of pay-per-view items that a customer ordered in a billing period while a second process may extract information identifying the number of premium television channels that the customer utilized in a billing period. In such an example, information collected from each process may be utilized by a single EI assembly to generate an invoice for the customer.

In the example method of FIG. 2, each process (203, 204) can include one or more tasks (206, 212). In the example method of FIG. 2, a task (206, 212) represents a sub-component of a process (203, 204). Each task (206, 212) may be embodied as computer program instructions that, when executed, carry out one part of the functionality that is carried out by a process (203, 204). For example, a process that extracts information identifying the number of pay-per-view items that a customer ordered in a billing period may include multiple tasks such as a first task that extracts information identifying the number of live pay-per-view items, such as a boxing match, that a customer ordered in a billing period and a second task that extracts information identifying the number of pre-recorded pay-per-view items, such as a movie available through an on-demand service, that the customer ordered in a billing period.

In the example method of FIG. 2, each task (206, 212) can include one or more steps (208, 210, 214, 216). In the example method of FIG. 2, a step (208, 210, 214, 216) represents a sub-component of a task (206, 212) and the most granular component of an EI assembly (202, 218, 220). Each step (208, 210, 214, 216) may be embodied as computer program instructions that, when executed, carry out one part of the functionality that is carried out by a task (206, 212). For example, a task that extracts information identifying the number of live pay-per-view items, such as a boxing match, that a customer ordered in a billing period may include a first step that accesses a live pay-per-view item database to identify possible purchases, a second step that accesses the customers set-top-box to identify pay-per-view items purchased through the set-top-box, and a third step that compares the retrieved pieces of information to identify live pay-per-view items that were purchased through the customer's set-top-box.

The example method of FIG. 2 includes choreographing (226), by an assembly engine (224), execution of a plurality of EI assemblies (202, 218, 220). In the example method of FIG. 2, the assembly engine (224) may choreograph (226) execution of a plurality of EI assemblies (202, 218, 220), for example, by selecting an execution order for the one or more EI assemblies (202, 218, 220), creating an execution schedule for the one or more EI assemblies (202, 218, 220) that includes a time to begin execution, a time interval between repeated executions of the one or more EI assemblies (202, 218, 220), and so on.

In the example method of FIG. 2, choreographing (226) execution of a plurality of EI assemblies (202, 218, 220) can include receiving (228), during the choreographing, one or more additional EI assemblies (220). In the example method of FIG. 2, the one or more additional EI assemblies (220) may be newly created EI assemblies, newly available EI assemblies, newly identified EI assemblies, and so on. In such an example, the one or more additional EI assemblies (220) may be accounted for when choreographing execution of the plurality of EI assemblies (202, 218, 220), such that the one or more additional EI assemblies (220) are included in a new choreography plan to be used for executing the plurality of EI assemblies (202, 218, 220).

In the example method of FIG. 2, choreographing (226) execution of a plurality of EI assemblies (202, 218, 220) can also include dynamically (232) choreographing execution of the additional EI assemblies (220) without halting execution of any other EI assembly (202, 218). In such an example, dynamically (232) choreographing execution of the additional EI assemblies (220) without halting execution of any other EI assembly (202, 218) may be carried out, for example, by scheduling the additional EI assemblies (220) to execute after the currently executing assemblies, such that the currently executing assemblies can continue to execute without deviating from the choreography plan. In such an example, altering the choreography plan would not cause an interrupt or other event that would cause any other EI assembly (202, 218) to cease executing.

In the example method of FIG. 2, choreographing (226) execution of a plurality of EI assemblies (202, 218, 220) can alternatively include detecting (230), in real time, an event (222). In the example method of FIG. 2, the event (222) may be invoked by a user, an EI administrator (238), the assembly engine (224), or one of the assemblies (202, 218, 220) themselves. Such an event (222) can represent a user request to take some action as well as be generated in response to the occurrence of a condition upon which an event (222) is automatically triggered.

In the example method of FIG. 2, choreographing (226) execution of a plurality of EI assemblies (202, 218, 220) can also include responsive (234) to the detected event (222), executing one or more of the EI assemblies (202, 218, 220). In the example method of FIG. 2, executing one or more of the EI assemblies (202, 218, 220) may be carried out, for example, by scheduling the one or more of the EI assemblies (202, 218, 220) for execution without halting execution of a currently executing EI assembly, by interrupting a currently executing EI assembly and immediately executing one or more of the EI assemblies (202, 218, 220) in response to the detected event (222), and so on.

The example method of FIG. 2 also includes reporting (236), by the assembly engine (224) to an EI administrator (238), information (240) related to execution of the EI assemblies (202, 218, 220). In the example method of FIG. 2, information (240) related to execution of the EI assemblies (202, 218, 220) may be reported (236) to the EI administrator (238), for example, through a user interface for the EI framework, by sending a message to a messaging account monitored by the EI administrator (238), and so on.

In the example method of FIG. 2, the information (240) related to execution of the EI assemblies can include output generated from executing an EI assembly. Such output may include, for example, values for all variables utilized when executing the EI assembly, a report generated by the EI assembly, of other collection of information that the EI assembly is designed to create, in a format that the EI assembly is designed to produce. For example, an assembly designed to create an invoice for a customer may be designed to produce an invoice in a predefined format. In such an example, the information (240) related to execution of the EI assemblies can include the actual invoice that was generated by executing the EI assembly.

The example method of FIG. 2 also includes storing (237) the information (240) related to execution of the EI assembly in an EI data repository (242). In the example method of FIG. 2, the EI data repository (242) may be embodied as a database or other persistent storage mechanism that the assembly engine (224) can access. The EI data repository (242) may serve as a storage mechanism in which information (240) related to execution of the many EI assemblies (202, 218, 220) can be stored, such that an EI administrator (238) monitor the execution of the EI assemblies (202, 218, 220).

Figure 3:
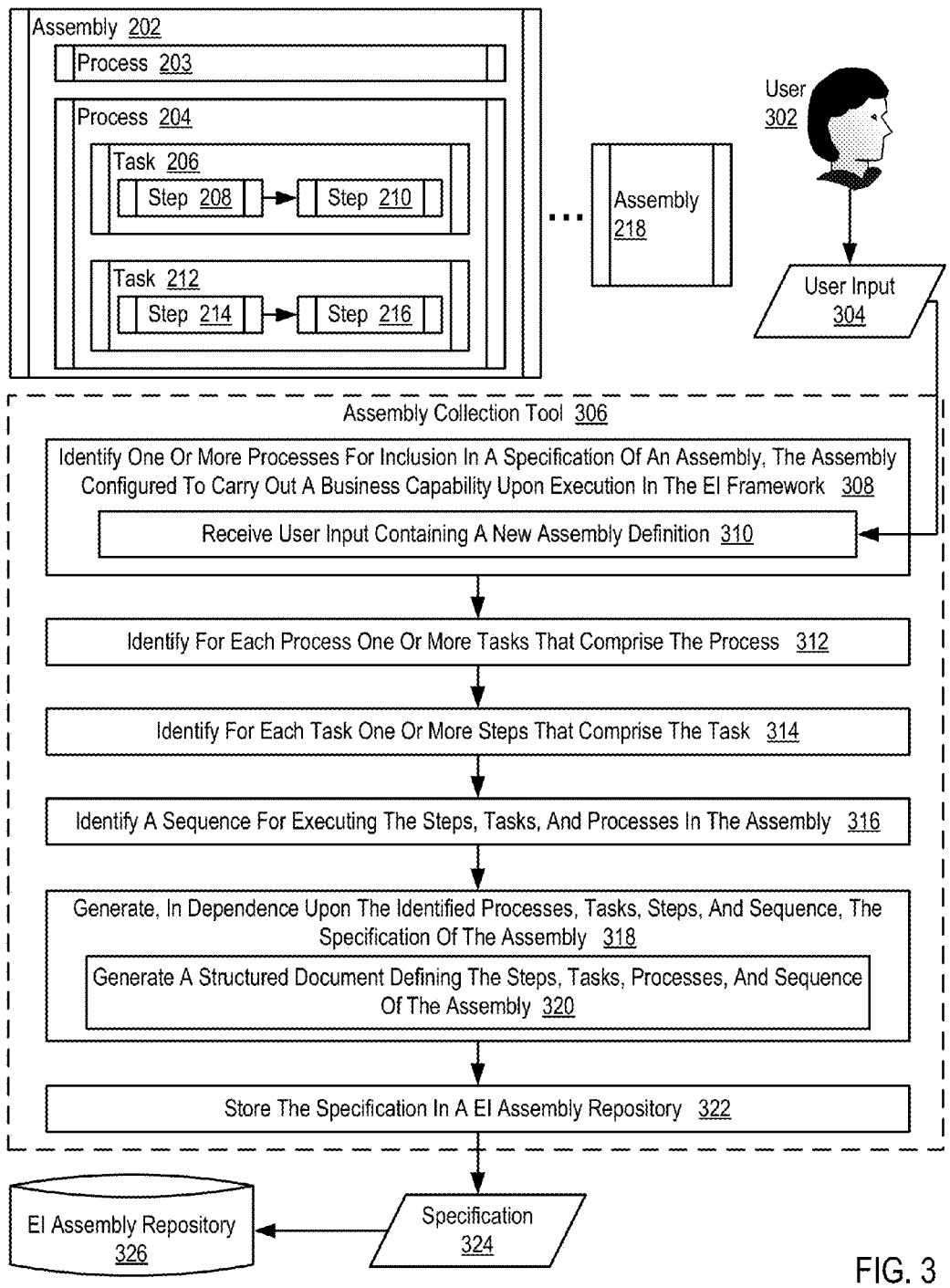
FIG. 3 sets forth a flow chart illustrating an exemplary method for managing a collection of assemblies in an EI framework according to embodiments of the present invention.

For further explanation of an assembly collection tool, FIG. 3 sets forth a flow chart illustrating an exemplary method for managing a collection of assemblies in an EI framework according to embodiments of the present invention. The example method of FIG. 3 includes identifying (308), by an assembly collection tool (306), one or more processes (203, 204) for inclusion in a specification (324) of an assembly (202). In the example method of FIG. 3, the assembly collection tool (306) is a module of automated computing machinery for defining assemblies. The assembly collection tool (306) may be embodied as computer program instructions that, when executed, present user interfaces that enable a user (302) to define a new assembly, automatically generate new assemblies based on user provide business functionality requirements, and so on.

In the example method of FIG. 3, identifying (308) one or more processes (203, 204) for inclusion in a specification (324) of an assembly (202) may be carried out, for example, by a user selecting the processes (203, 204) that comprise a particular assembly (202), by examining metadata associated with a particular process (203, 204) that identifies the assemblies that the process (203, 204) is part of, by examining metadata associated with a assembly (202) process (203, 204) that identifies the processes that are included in the assembly, or by examining other attributes associated with the assembly (202) and other attributes associated with the process (203, 204) so as to intelligently determine which particular processes are part of a particular assembly.

In the example method of FIG. 3, the specification (324) of an assembly (202) represents a definition a particular assembly (202), including a listing of the particular components that form the assembly (202). The specification (324) of the assembly (202) may be embodied, for example, as a structured document or other data structure that includes information defining the assembly (202). For example, an assembly for generating an invoice for a television service provider may be defined by the following specification, embodied here as a structured document:

```
<Assembly name = "invoice_generator">
    <Process name = "PPV_charge_generator">
        <Task name = "live_PPV_charge_generator">
            <Step name = "sporting_event_PPV_generator" src ="//
            sporting_event_PPV_generator.exe">
            </Step>
            <Step name = "live_music_PPV_generator" src ="//
            live_music_PPV_generator.exe">
            </Step>
        </Task>
        <Task name = "on_demand_PPV_charge_generator">
            <Step name = "movie_PPV_generator" src ="//
            movie_PPV_generator.exe">
            </Step>
            <Step name = "television_show_PPV_generator" src ="//
            television_show_PPV_generator.exe">
            </Step>
        </Task>
    </Process>
    <Process name = "premium_content_charge_generator">
        <Task name = "premium_movie_channel_charge_generator">
            <Step name = "moviechannel_charge_generator" src ="//
            moviechannel_charge_generator.exe">
            </Step>
            <Step name = "classicmoviechannel_charge_generator"
            src ="//classicmoviechannel_charge_generator.exe">
            </Step>
        </Task>
        <Task name = "premium_sports_channel_charge_generator">
            <Step name = "soccer_channel_charge_generator" src =
            "//soccer_channel_charge_generator.exe">
            </Step>
            <Step name = "rugby_channel_charge_generator" src ="//
            rugby_channel_charge_generator.exe">
            </Step>
        </Task>
    </Process>
</Assembly>
```

The example assembly specification is a specification for an assembly named "invoice_generator" for generating an invoice for a television service provider. The assembly includes two processes: a first process named "PPV_charge_generator" for generating invoice charges related to pay-per-view content ordered by a customer and a second process named "premium_content_charge_generator" for generating invoice charges for premium content ordered by the customer. The first process is composed of two tasks, each of which includes two steps that may be carried out by executing computer program instructions stored in memory at the location specified in the "src" attribute for each step. The first second process is also composed of two tasks, each of which includes two steps that may be carried out by executing computer program instructions stored in memory at the location specified in the "src" attribute for each step. Readers will understand that the specification described above is only one example of a specification for an assembly. Specifications for assemblies may be embodied in other formats, with different attributes, in accordance with embodiments of the present invention.

In the example method of FIG. 3, identifying (308) one or more processes (203, 204) for inclusion in the specification (324) of an assembly (202) can include receiving (310), from a user (302), user input (304) containing a new assembly definition. In the example method of FIG. 3, the user input (304) containing a new assembly definition can be received (310) via a user interface that presents the user (302) with a tool for creating assemblies, including a listing of available processes, tasks, and steps that may be included in the new assembly. The user input (304) containing a new assembly definition can be received (310) by parsing metadata describing the new assembly, and transformed into a standard format for the EI framework by generating a specification (324) of the new assembly in accordance with assembly specification rules included as part of the EI framework.

The example method of FIG. 3 also includes identifying (312) for each process (203, 204), by the assembly collection tool (306), one or more tasks (206, 212) that comprise the process (203, 204). In the example method of FIG. 3, identifying (312) for each process (203, 204) one or more tasks (206, 212) that comprise the process (203, 204) may be carried out, for example, by parsing the user input (304) which contained a new assembly definition. Alternatively, identifying (312) for each process (203, 204) one or more tasks (206, 212) that comprise the process (203, 204) may be carried out by searching a process repository that associates each process with one or more tasks that comprise the process.

The example method of FIG. 3 also includes identifying (314) for each task (206, 212), by the assembly collection tool (306), one or more steps (208, 210, 214, 216) that comprise the task (206, 212). In the example method of FIG. 3, identifying (314) one or more steps (208, 210, 214, 216) that comprise each task (206, 212) may be carried out, for example, by parsing the user input (304) which contained a new assembly definition. Alternatively, identifying (314) one or more steps (208, 210, 214, 216) that comprise each task (206, 212) may be carried out by searching a task repository that associates each task with one or more steps that comprise the task.

The example method of FIG. 3 also includes identifying (316), by the assembly collection tool (306), a sequence for executing the steps (208, 210, 214, 216), tasks (206, 212), and processes (203, 204) in the assembly (202). In the example method of FIG. 3, identifying (316) a sequence for executing the steps (208, 210, 214, 216), tasks (206, 212), and processes (203, 204) in the assembly (202) may be carried out, for example, through the use of a user interface that enables a user (302) to set the execution sequence of the components of the new assembly.

The example method of FIG. 3 also includes generating (318), in dependence upon the identified processes, tasks, steps, and sequence, the specification (324) of the assembly (202). In the example method of FIG. 3, generating (318) the specification (324) of the assembly (202) may be carried out by generating (320) a structured document defining the steps (208, 210, 214, 216), tasks (206, 212), processes (203, 204), and sequence of the assembly (202). The structured document may include any number of tags, attributes, and values of those attributes such that the structured document provides a metamodel of the assembly, including the processes, tasks, steps, and sequence of execution that defines the assembly.

The example method of FIG. 3 also includes storing (322) the specification (324) in a EI assembly repository (326). In the example method of FIG. 3, the EI assembly repository (326) may be embodied as a database or other persistent storage mechanism that the assembly collection tool (306) can access. The EI assembly repository (326) may serve as a storage mechanism in which specifications defining a plurality of assemblies can be stored, such that an EI administrator or other user (302) can examine the assemblies that are part of a particular EI framework to determine the available business functions that may be executed by the EI framework.

Figure 4:
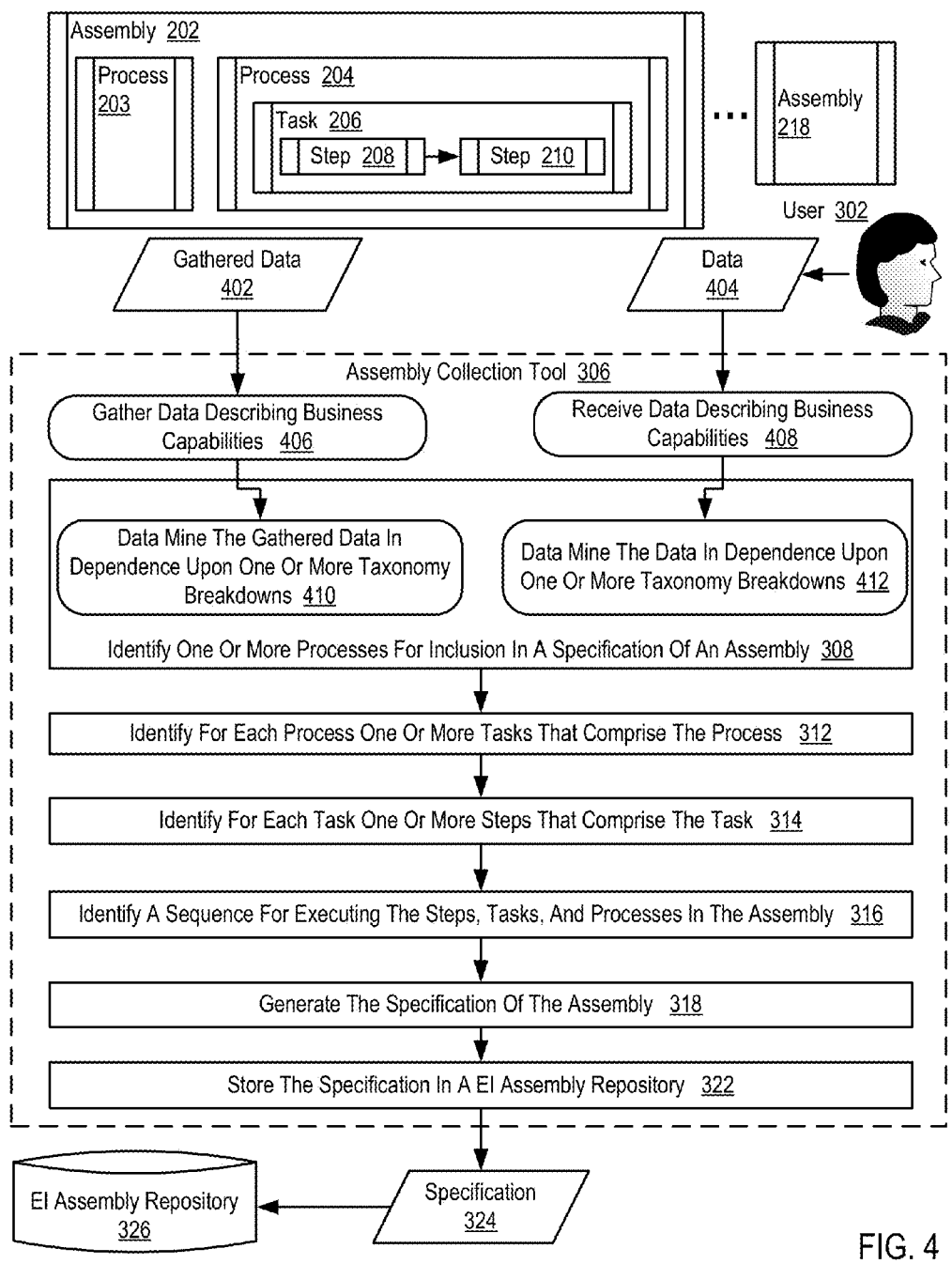
FIG. 4 sets forth a flow chart illustrating an exemplary method for managing a collection of assemblies in an EI framework according to embodiments of the present invention.

For further explanation of assembly collection tool, FIG. 4 sets forth a flow chart illustrating an exemplary method for managing a collection of assemblies in an EI framework according to embodiments of the present invention. The example method of FIG. 4 is similar to the example method of FIG. 3 as it also includes:

- identifying (308), by an assembly collection tool (306), one or more processes (203, 204) for inclusion in a specification (324) of an assembly (202);
- identifying (312) for each process (203, 204), by the assembly collection tool (306), one or more tasks (206, 212) that comprise the process (203, 204);
- identifying (314) for each task (206, 212), by the assembly collection tool (306), one or more steps (208, 210, 214, 216) that comprise the task (206, 212);
- identifying (316), by the assembly collection tool (306), a sequence for executing the steps (208, 210, 214, 216), tasks (206, 212), and processes (203, 204) in the assembly (202);
- generating (318), in dependence upon the identified processes, tasks, steps, and sequence, the specification (324) of the assembly (202); and
- storing (322) the specification (324) in a EI assembly repository (326).

The example method of FIG. 4 also includes receiving (408), by the assembly collection tool (306) from a user (302), data (404) describing business capabilities. In the example method of FIG. 4, the data (404) describing business capabilities may be received (408) via a user interface presented to the user (302) that collects data (404) describing business capabilities. In the example method of FIG. 4, the data (404) describing business capabilities may also be received (408) from the user (302) as a structured document that can be parsed for the purposes of generating a specification (324) of a new assembly in a format that is acceptable in the EI framework.

In the example method of FIG. 4, identifying (308) one or more processes (203, 204), identifying (312) one or more tasks (206), identifying (314) one or more steps (208, 210), and identifying (316) a sequence for executing the steps (208, 210), tasks (206), and processes (203, 204) can include data (412) mining the data (404) in dependence upon a one or more taxonomy breakdowns. In the example method of FIG. 4, each taxonomy breakdown is associated with a type of process and defines a structure of processes of the type. In the example method of FIG. 4, data (412) mining the data (404) in dependence upon a one or more taxonomy breakdowns may therefore be carried out, for example, by parsing the data (404) describing business capabilities and matching the data (404) describing business capabilities to definitions of existing processes, tasks, or steps in the EI framework to identify processes, tasks, or steps that may be used to implement and carry out the business capabilities described in the data (404).

The example method of FIG. 4 also includes gathering (406), by the assembly (306) collection tool from one or more data stores in the EI framework, data (402) describing business capabilities. In the example method of FIG. 4, the data store may be embodied, for example, as a database or other repository of data that describes business capabilities. In such an example, gathering (406) the data (402) describing business capabilities may be carried out, for example, by periodically searching the data store for new data that describes newly defined business capabilities.

In the example method of FIG. 4, identifying (308) one or more processes (203, 204), identifying (312) one or more tasks (206), identifying (314) one or more steps (208, 210), and identifying (316) a sequence for executing the steps (208, 210), tasks (206), and processes (203, 204) can include data (410) mining the gathered data (402) in dependence upon a one or more taxonomy breakdowns. In the example method of FIG. 4, each taxonomy breakdown is associated with a type of process and defines a structure of processes of the type. In the example method of FIG. 4, data (410) mining the gathered data (402) in dependence upon a one or more taxonomy breakdowns may therefore be carried out, for example, by parsing the gathered data (402) describing business capabilities and matching the gathered data (402) describing business capabilities to definitions of existing processes, tasks, or steps in the EI framework to identify processes, tasks, or steps that may be used to implement and carry out the business capabilities described in the gathered data (402).

Figure 5:
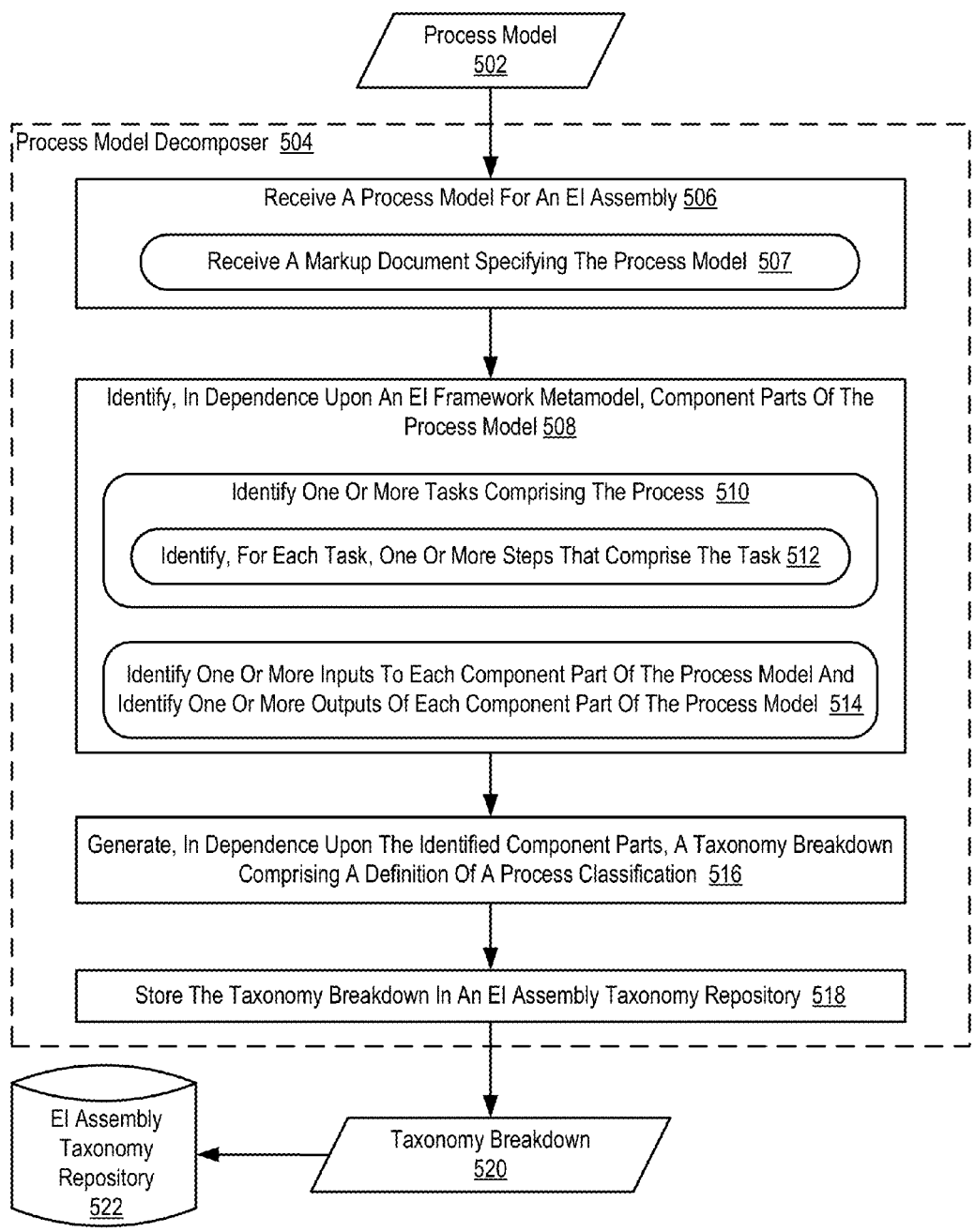
FIG. 5 sets forth a flow chart illustrating an exemplary method for decomposing a process model in an EI framework according to embodiments of the present invention.

For further explanation of a process model decomposer, FIG. 5 sets forth a flow chart illustrating an exemplary method for decomposing a process model in an EI framework according to embodiments of the present invention. The example method of FIG. 5 includes receiving (506), by a process model decomposer (504), a process model (502) for an EI assembly. In the example method of FIG. 5, the process model decomposer (504) is a module of automated computing machinery for analyzing and defining processes. The process model decomposer (504) may be embodied, for example, as computer program instructions that, when executed, analyze processes, define processes, store definitions of such processes, and so on.

In the example method of FIG. 5, the process model (502) describes a series of business process actions that are carried out by a process that is modeled by the process model (502). In the example method of FIG. 5, receiving (506) a process model (502) for an EI assembly may be carried out, for example, by receiving input from a user describing business process actions that are to be carried out, by receiving a process model (502) over a network, by retrieving a process model (502) from a process model database, and so on.

In the example method of FIG. 5, receiving (506) the process model (502) for an EI assembly can include receiving (507) a markup document specifying the process model (502). In the example method of FIG. 5, the markup document specifying the process model (502) may be embodied, for example, as an Extensible Markup Language ('XML') document that includes an identification of one or more processes, the actions to be taken to carry out the process, a pointer to executable computer program instructions for carrying the process, a description of the inputs to and the outputs from the process, and so on.

The example method of FIG. 5 also includes identifying (510), by the process model decomposer (504), component parts of the process model (502) in dependence upon an EI framework metamodel. In the example method of FIG. 5, an EI framework metamodel may include, for example, a listing of the steps, tasks, processes, and assemblies that are included in the EI framework, as well as the inputs, outputs, and a description of the business capabilities that each step, task, process, and assembly carries out. In such an example, the EI framework metamodel may be used to identify (510) implementable components in the EI framework that may be used to carry out business actions described in the process model (502).

In the example method of FIG. 5, identifying (510) component parts of the process model (502) can include identifying (510) one or more tasks comprising the process. In the example method of FIG. 5, identifying (510) one or more tasks comprising the process can also include identifying (512), for each task, one or more steps that comprise the task. As described above, a process is composed of one or more tasks and a task is comprised of one or more steps. As such, for each process that is identified (510) as being a component part of a process model (502), the one or more tasks that comprise the process can be identified. In a similar manner, for each task that is identified (510) as being a component part of a process model (502), the one or more steps that comprise the task can be identified.

In the example method of FIG. 5, identifying (510) component parts of the process model (502) can alternatively include identifying (514) one or more inputs to each component part of the process model (502) and identifying one or more outputs of each component part of the process model (502). In the example method of FIG. 5, each step, task, process, and assembly in the EI framework can be defined by the inputs that step, task, process, or assembly receives, as well as by the outputs that step, task, process, or assembly generates. As such, identifying (510) component parts of the process model (502) may be carried out by identifying (514) one or more inputs to each component part of the process model (502), identifying one or more outputs of each component part of the process model (502), and identifying a step, task, process, or assembly that defined by identical inputs and outputs.

The example method of FIG. 5 also includes generating (516), in dependence upon the identified component parts, a taxonomy breakdown (520) comprising a definition of a process classification. In the example method of FIG. 5, the taxonomy breakdown (520) may include an identification of the steps, tasks, and processes that, when combined and ordered in accordance with the process model (502), can carry out the business actions identified in the process model (502).

The example method of FIG. 5 also includes storing (518) the taxonomy breakdown (520) in an EI assembly taxonomy repository (522). In the example method of FIG. 5, the EI assembly taxonomy repository (522) may be a database or other persistent storage mechanism for storing definitions of assemblies, including the processes, tasks, and steps that make up the assembly. The EI assembly taxonomy repository (522) may therefore be examined by an EI administrator or other entity to identify the particular business capabilities that may be executed by the assemblies, processes, tasks, and steps that are included in the EI framework.

Figure 6:
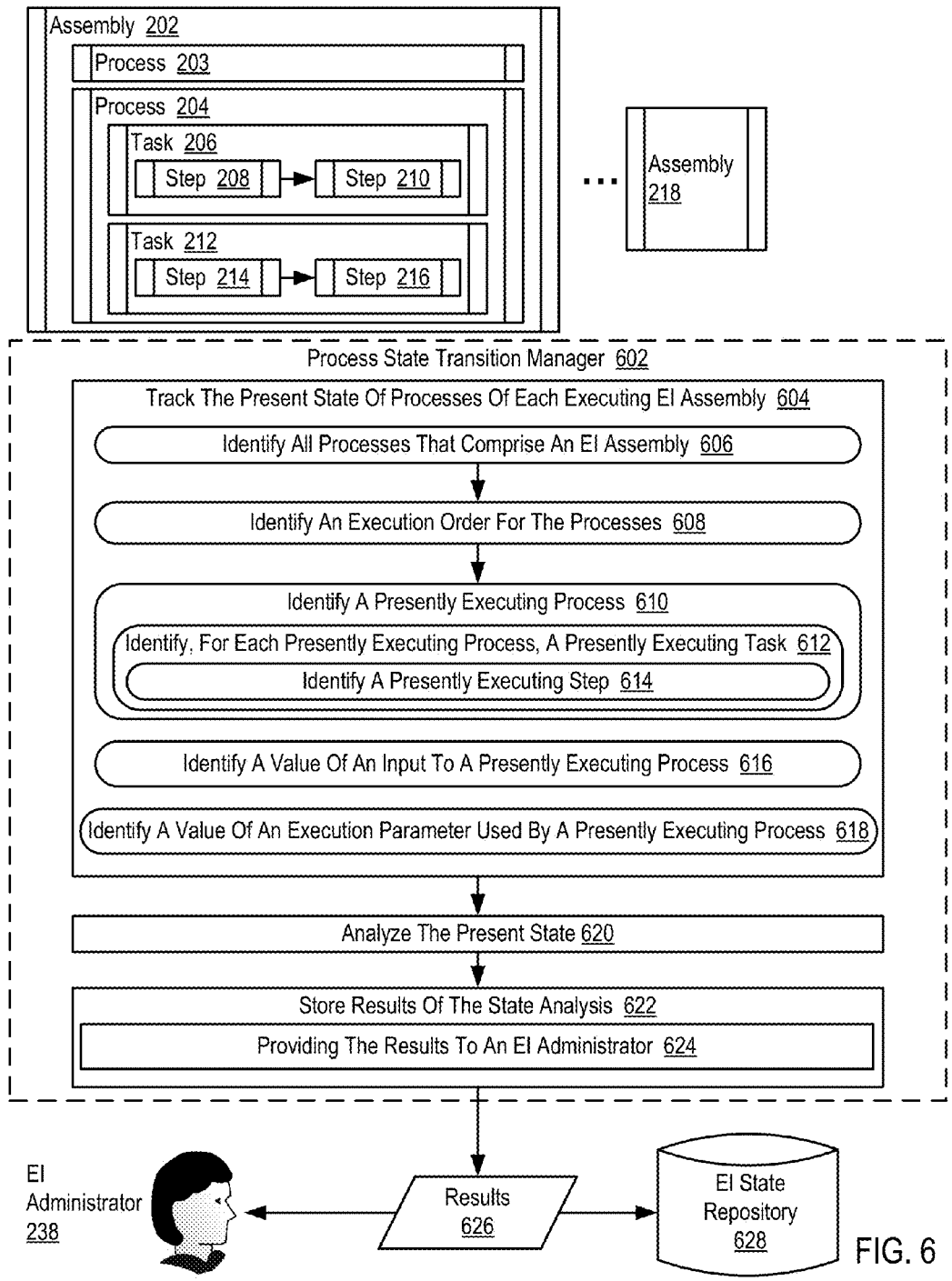
FIG. 6 sets forth a flow chart illustrating an exemplary method for managing processes in an EI framework according to embodiments of the present invention.

For further explanation of a process state transition manager, FIG. 6 sets forth a flow chart illustrating an exemplary method for managing processes in an EI framework according to embodiments of the present invention. The example method of FIG. 6 includes tracking (604), by the process state transition manager (602), the present state of processes (203, 204) of each executing EI assembly (202, 218). In the example method of FIG. 6, the process state transition manager (602) is a module of automated computer machinery configured to monitor the execution state of a process. The process state transition manager (602) may be embodied, for example, as computer program instructions that, when executed, can determine the current execution state of one or more processes, compare the current execution state of one or more processes to an ideal execution state, and alter the execution of a process to bring its current execution state closer to its ideal execution state.

In the example method of FIG. 6, tracking (604) the present state of processes (203, 204) of each executing EI assembly (202, 218) can include identifying (606) all processes (203, 204) that comprise an EI assembly (202).

Identifying (606) all processes (203, 204) that comprise an EI assembly (202) may be carried out, for example, by searching EI assembly taxonomy repository as described above with reference to FIG. 5. Identifying (606) all processes (203, 204) that comprise an EI assembly (202) may also be carried out, for example, by examining a specification the EI assembly (202) that identifies each process that is part of the assembly or in other ways as will occur to those of skill in the art.

In the example method of FIG. 6, tracking (604) the present state of processes (203, 204) of each executing EI assembly (202, 218) can also include identifying (608) an execution order for the processes (203, 204). Identifying (608) an execution order for the processes (203, 204) may be carried out, for example, by searching EI assembly taxonomy repository that identifies each process that is part of the EI assembly (202) and the order in which those processes are executed. Identifying (608) an execution order for the processes (203, 204) may also be carried out, for example, by examining a specification the EI assembly (202) that identifies each process that is part of the assembly and the order in which those processes are executed.

In the example method of FIG. 6, tracking (604) the present state of processes (203, 204) of each executing EI assembly (202, 218) can also include identifying (610) a presently executing process (203, 204). Identifying (610) a presently executing process (203, 204) may be carried out, for example, by requiring each EI assembly (202) and the processes (203, 204) that are part of the EI assembly (202) to register with the process state transition manager (602) prior to executing, so that the process state transition manager (602) is always aware of all processes and EI assemblies that are executing at a given time.

In the example method of FIG. 6, tracking (604) the present state of processes (203, 204) of each executing EI assembly (202, 218) can also include identifying (612), for each presently executing process (203, 204), a presently executing task (206, 212). Identifying (612), for each presently executing process (203, 204), a presently executing task (206, 212) may be carried out, for example, by requiring each EI assembly (202), each process (203, 204), and the tasks (206, 212) that are part of the EI assembly (202) to register with the process state transition manager (602) prior to executing, so that the process state transition manager (602) is always aware of all tasks, processes, and EI assemblies that are executing at a given time.

In the example method of FIG. 6, identifying (612) a presently executing task (206, 212) can include identifying (614) a presently executing step (208, 210, 214, 216). Identifying (614) a presently executing step (208, 210, 214, 216) may be carried out, for example, by requiring each EI assembly (202), each process (203, 204), each task (206, 212), and each step (208, 210, 214, 216) that are part of the EI assembly (202) to register with the process state transition manager (602) prior to executing, so that the process state transition manager (602) is always aware of all steps, tasks, processes, and EI assemblies that are executing at a given time.

In the example method of FIG. 6, tracking (604) the present state of processes (203, 204) of each executing EI assembly (202, 218) can also include identifying (616) a value of an input to a presently executing process (203, 204). In the example method of FIG. 6, identifying (616) a value of an input to a presently executing process (203, 204) may be carried out, for example, by storing the values of all input parameters that are passed to a process in a table managed by the process state transition manager (602). The values of all input parameters that are passed to a process may be stored in such a table prior to executing the process, such that the table includes detailed information identifying the particular inputs that were passed to a process prior to its execution. In a similar manner, the table may also include values of global variables or other inputs that, while not passed as parameters, are utilized by the process.

In the example method of FIG. 6, tracking (604) the present state of processes (203, 204) of each executing EI assembly (202, 218) can also include identifying (618) a value of an execution parameter used by a presently executing process (203, 204). In the example method of FIG. 6, an execution parameter used by a presently executing process (203, 204) represents some variable whose value is used or otherwise manipulated by the presently executing process (203, 204). Identifying (618) a value of an execution parameter used by a presently executing process (203, 204) can be carried out, for example, by checking an address in memory that corresponds to the location in memory of the execution parameter, by requiring the presently executing process (203, 204) to report a proposed change in the value of the execution parameter to the process state transition manager (602), and so on.

The example method of FIG. 6 also includes analyzing (620), by the process state transition manager (602), the present state. In the example method of FIG. 6, analyzing (620) the present state of the currently executing process (203, 204) may be carried out, for example, by examining the values of the inputs to the currently executing process (203, 204) and examining the values of the execution parameters of the currently executing process (203, 204) to verify that the values are valid. For example, the process state transition manager (602) may verify that the input values and the execution parameter values do not include any unexpected null values. The process state transition manager (602) may further verify that the input values and the execution parameter values do not include values that are outside of a range of predetermined acceptable values. Consider an example in which a process is designed to gather the amount of minutes used by a mobile phone user in a given month. In such an example, the retrieved value representing the amount of minutes used by the mobile phone user in a month may be compared to the amount of total minutes in the month, to verify that the amount of minutes used by the mobile phone user in a month is not greater than the amount of total minutes in the month. If the amount of minutes used by the mobile phone user in a month is greater than the amount of total minutes in the month, an error condition has clearly occurred and corrective action would need to take place.

The example method of FIG. 6 also includes storing (622), by the process state transition manager (602), results (626) of the state analysis. In the example method of FIG. 6, the results (626) of the state analysis may be stored (622) in an EI state repository (628). The EI state repository (628) of FIG. 6 may be embodied, for example, as a database or other persistent data storage mechanism for storing information related to the current state of processes executing in the EI framework.

In the example method of FIG. 6, storing (622) the results (626) of the analysis can include providing (624) the results (626) to an EI administrator (238). Providing (624) the results (626) to an EI administrator (238) may be carried out, for example, by writing the results (626) to an interface that is monitored by the EI administrator (238), by writing the results (626) to a log that is monitored by the EI administrator (238), by sending the results (626) to a messaging account for the EI administrator (238), and so on.

Figure 7:
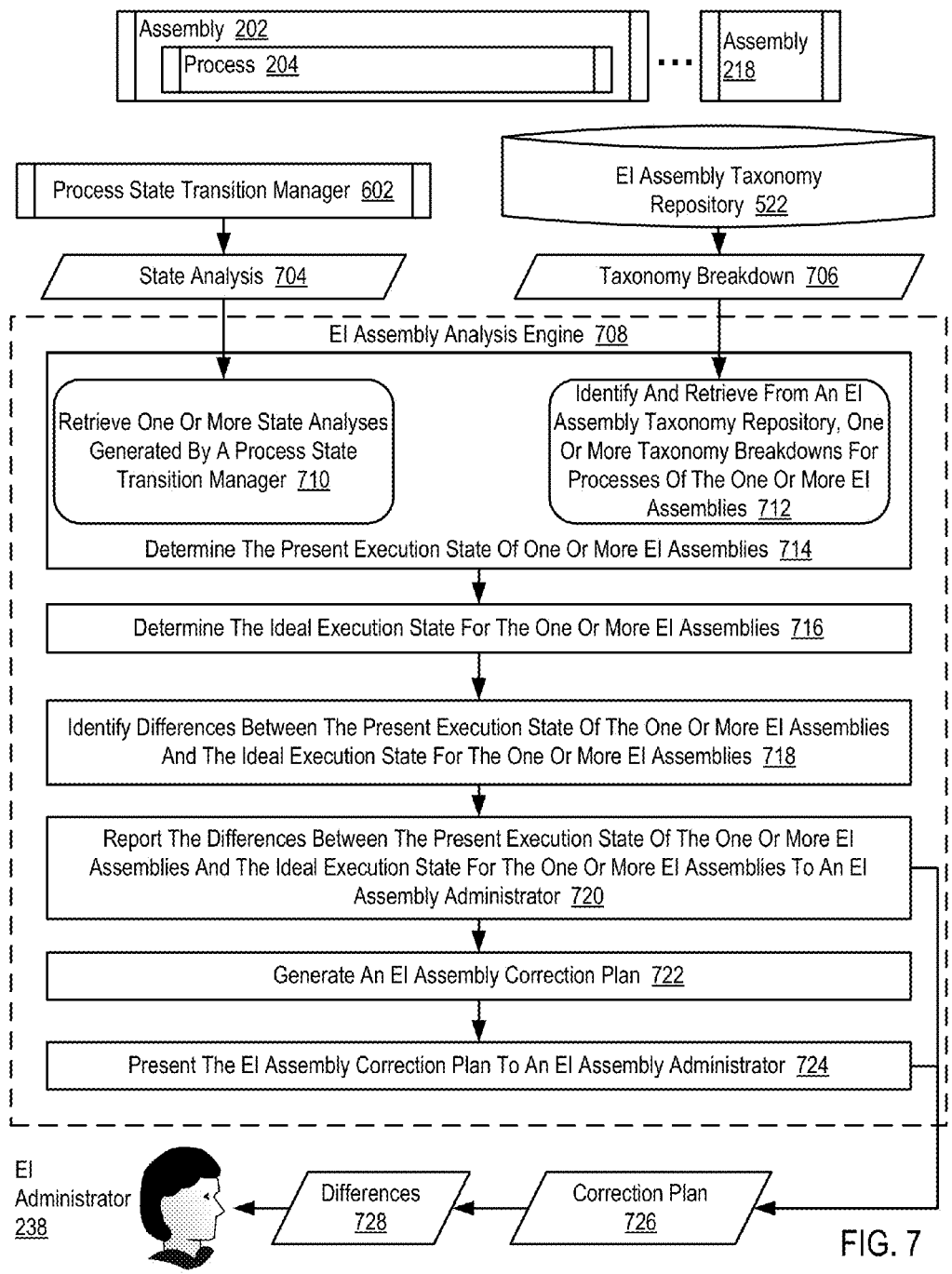
FIG. 7 sets forth a flow chart illustrating an exemplary method for EI assembly analysis in an EI framework according to embodiments of the present invention.

For further explanation of an EI assembly analysis engine, FIG. 7 sets forth a flow chart illustrating an exemplary method for EI assembly analysis in an EI framework according to embodiments of the present invention. The example method of FIG. 7 includes determining (714), by an EI assembly analysis engine (708), the present execution state of one or more EI assemblies (202). In the example method of FIG. 7, the EI assembly analysis engine (708) is a module of automated computing machinery monitoring the state of assemblies that are executing in the EI framework. The EI assembly analysis engine (708) may be embodied as computer program instructions that, when executed, determine the execution state of all assemblies that are executing in the EI framework, compare the execution state of all assemblies that are executing in the EI framework to an ideal execution state of all assemblies that are executing in the EI framework, and take corrective action in response to differences between the execution state of the assemblies and the ideal execution state of the assemblies.

In the example of FIG. 7, the present execution state of one or more EI assemblies (202) may be determined (714) individually or in conjunction with each other. That is, the analysis engine (708) may determine the execution state of a single EI assembly or determine the current execution state of some combination of EI assemblies such as, for example, a combination of EI assemblies that augment each other or are used in coordination with each other.

In the example method of FIG. 7, determining (714) the present execution state of the one or more EI assemblies (202) can include retrieving (710) one or more state analyses (704) generated by a process state transition manager (602). As described above with reference to FIG. 6, a process state transition manager (602) is configured to determine the current execution state of one or more processes and compare the current execution state of one or more processes to an ideal execution state. In the example method of FIG. 7, the results from analyzing (620) the present execution state of a presently executing process are included in a state analysis (704) that can be retrieved (710) from the process state transition manager (602).

In the example method of FIG. 7, determining (714) the present execution state of the one or more EI assemblies (202) can also include identifying (712) and retrieving from an EI assembly taxonomy repository (522), one or more taxonomy breakdowns (706) for processes (204) of the one or more EI assemblies (202). In the example method of FIG. 7, each taxonomy breakdown (706) is associated with a type of process and also defines a structure of processes of the type. The taxonomy breakdown (706) of FIG. 7 may be useful in determining (714) the present execution state of the one or more EI assemblies (202) as the taxonomy breakdown (706) can include information identifying the steps, tasks, and processes that are included in each assembly. As such, information identifying the current execution state of the steps, tasks, and processes that are included in each assembly may be gathered as information useful in determining the state of the assemblies themselves.

The example method of FIG. 7 also includes determining (716), by the EI assembly analysis engine (708), the ideal execution state for the one or more EI assemblies (202). In the example method of FIG. 7, the ideal execution state for the one or more EI assemblies (202) may be determined (716), for example, by examining a taxonomy breakdown (706) that includes information containing acceptable range of values for various input parameters and execution variables utilized by each EI assembly (202). Such information may also be contained in specifications of the one or more EI assemblies (202) or otherwise provided by an EI administrator (238).

In the example of FIG. 7, the ideal execution state of the one or more EI assemblies (202) may be determined (716) individually or in conjunction with each other. That is, the analysis engine (708) may determine the ideal execution state of a single EI assembly or determine the ideal execution state of some combination of EI assemblies such as, for example, a combination of EI assemblies that augment each other or are used in coordination with each other.

The example method of FIG. 7 also includes identifying (718), by the EI assembly analysis engine (708), differences (728) between the present execution state of the one or more EI assemblies (202) and the ideal execution state for the one or more EI assemblies (202). In the example method of FIG. 7, identifying (718) differences (728) between the present execution state of the one or more EI assemblies (202) and the ideal execution state for the one or more EI assemblies (202) may be determined (716), for example, by comparing the values of actual inputs, outputs, and execution variables associated with each EI assembly (202) to acceptable range of values for various inputs, outputs, and execution variables utilized by each EI assembly (202).

The example method of FIG. 7 also includes reporting (720) the differences (728) between the present execution state of the one or more EI assemblies (202) and the ideal execution state for the one or more EI assemblies (202) to an EI administrator (238). In the example method of FIG. 7, reporting (720) the differences (728) between the present execution state of the one or more EI assemblies (202) and the ideal execution state for the one or more EI assemblies (202) to an EI administrator (238) may be carried out, for example, by including a description of the differences (728) in a log that is viewable by the EI administrator (238), by sending a description of the differences (728) in a message directed to messaging account associated with the EI administrator (238), and so on.

The example method of FIG. 7 also includes generating (722), by the EI assembly analysis engine (202), an EI assembly correction plan (726). In the example method of FIG. 7, the EI assembly correction plan (726) may include an identification of steps, tasks, and processes to be executed, as well as an execution sequence for the steps, tasks, and processes. The steps, tasks, and processes may simply be the original steps, tasks, and processes that were executed as part of the one or more EI assemblies (202), to be executed again as a form of retrying the execution of the one or more EI assemblies (202). Alternatively, the steps, tasks, and processes of the correction plan (726) may be a different set of steps, tasks, and processes than were executed as part of the one or more EI assemblies (202), to be executed for the purposes of performing a different set of operations than were originally executed as part of the execution of the one or more EI assemblies (202). The correction plan (726) may also include values for various inputs and execution parameters associated with each EI assembly (202).

The example method of FIG. 7 also includes presenting (724) the EI assembly correction plan (726) to an EI administrator (238). In the example method of FIG. 7, the correction plan (726) may be presented (724) to the EI administrator (238) for approval. The correction plan (726) may be presented (724) to the EI administrator (238) through the use of a user interface to the EI framework and may further be altered by the EI administrator (238) as necessary.

Figure 8:
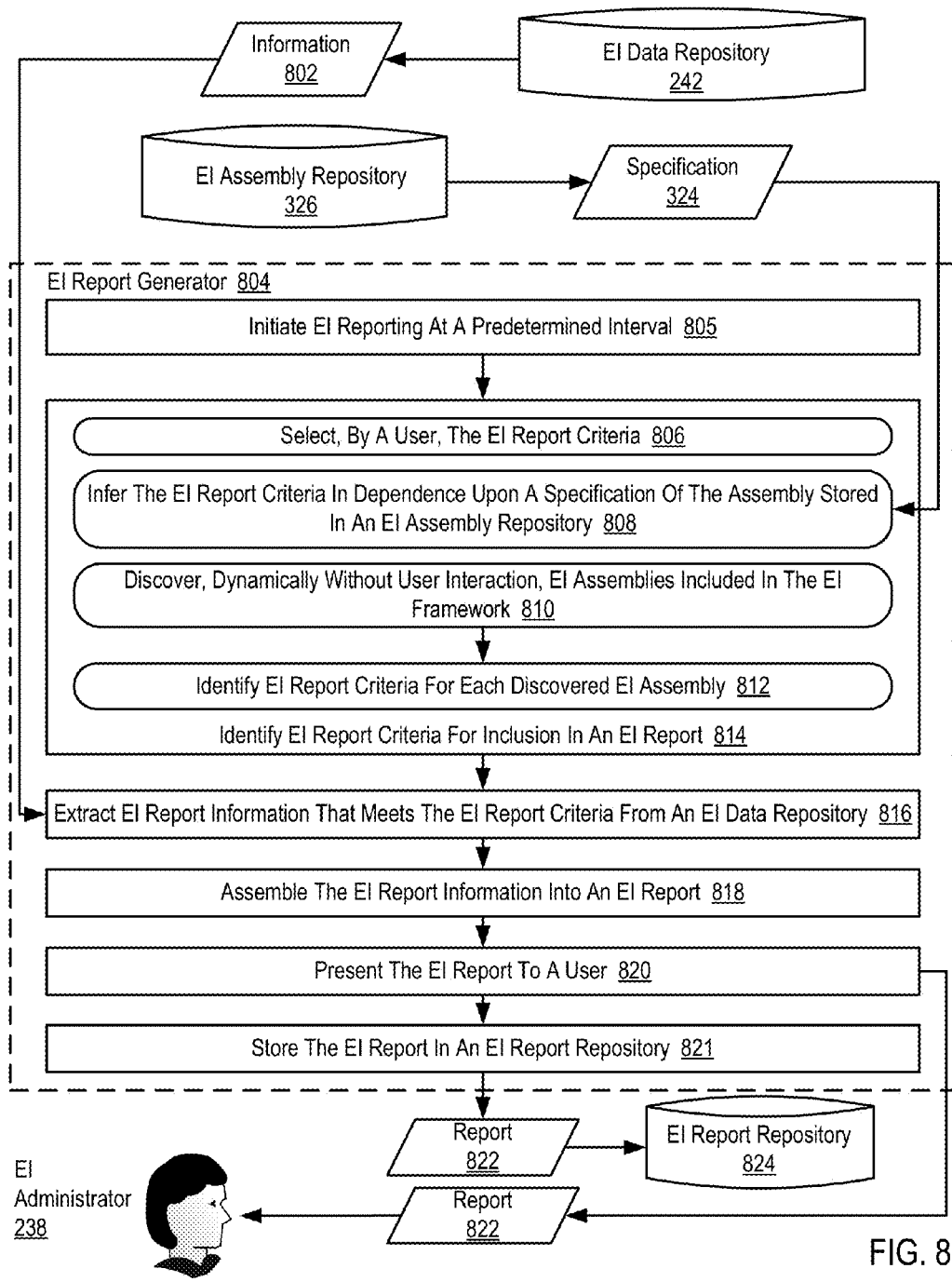
FIG. 8 sets forth a flow chart illustrating an exemplary method for EI reporting in an EI framework according to embodiments of the present invention.

For further explanation of an EI report generator, FIG. 8 sets forth a flow chart illustrating an exemplary method for EI reporting in an EI framework according to embodiments of the present invention. The example method of FIG. 8 includes identifying (814), by an EI report generator (804), EI report criteria for inclusion in an EI report (822). In the example of FIG. 8, the EI report generator (804) is a module of automated computing machinery for generating reports in an EI framework. The EI report generator (804) may be embodied, for example, as computer program instructions for determining the format of a report, gathering data to go into the report, generating the report, and distributing the report as necessary.

In the example of FIG. 8, the EI report generator (804) can identify (814) EI report criteria for inclusion in an EI report (822), for example, by examining an EI assembly specification to determine the steps, tasks, and processes that are executed as part of the EI assembly, as well as the input, output, and execution variables associated with steps, tasks, and processes that are executed as part of the EI assembly. In such an example, the input, output, and execution variables that are associated with the steps, tasks, and processes that are executed as part of the EI assembly may be included as reportable criteria in an EI report (822). Likewise, the EI report (822) may include error messages, messages from the EI administrator (238), and other information as will occur to those of skill in the art.

In the example method of FIG. 8, identifying (814) EI report criteria for inclusion in an EI report (822) can include selecting (806), by an EI administrator (238), the EI report criteria. The EI administrator (238) may select (806) the EI report criteria, for example, by presenting the EI administrator (238) with a list of candidate criteria for inclusion in the EI report (822) through a user interface to the EI framework. In such an example, the EI administrator (238) may identify the criteria that are meaningful to the EI administrator (238) and select (806) those criterion for inclusion in the EI report (822).

In the example method of FIG. 8, identifying (814) EI report criteria for inclusion in an EI report (822) can also include inferring (808) the EI report criteria in dependence upon a specification (324) of the assembly stored in an EI assembly repository (326). In the example method of FIG. 8, the specification (324) may include, for example, priorities assigned to particular steps, tasks, and processes such that information regarding the execution of the steps, tasks, and processes with a priority above a predetermined threshold may be inferred (808) to be worthy of inclusion in the EI report (822).

In the example method of FIG. 8, identifying (814) EI report criteria for inclusion in an EI report (822) can also include discovering (810), dynamically without user interaction, EI assemblies included in the EI framework. Discovering (810) EI assemblies included in the EI framework may be carried out dynamically without user interaction, for example, by parsing every specification (324) in an EI assembly repository (326) to identify all of the EI assemblies included in the EI framework. Alternatively, discovering (810) EI assemblies included in the EI framework may be carried out dynamically without user interaction by requiring that every EI assembly reports its existence to the EI report generator (804) prior to executing so that, over time, the EI report generator (804) learns of all executing assemblies in the EI framework.

In the example method of FIG. 8, identifying (814) EI report criteria for inclusion in an EI report (822) can also include identifying (812) EI report criteria for each discovered EI assembly. Identifying (812) EI report criteria for each discovered EI assembly may be carried out, for example, by retrieving a specification for each discovered EI assembly from the EI assembly repository (326). Each specification can be examined to determine the steps, tasks, and processes that are executed as part of the EI assembly, as well as the input, output, and execution variables associated with steps, tasks, and processes that are executed as part of the EI assembly. In such an example, the input, output, and execution variables that are associated with the steps, tasks, and processes that are executed as part of the EI assembly may be included as reportable criteria in an EI report (822).

The example method of FIG. 8 also includes extracting (816), by an EI report generator (804), EI report information (802) that meets the EI report criteria from an EI data repository (242). In the example of FIG. 8, the EI data repository (824) can include information related to the execution of one or more assemblies such as, for example, historical values for inputs, outputs, and execution variables for each step, task, and process for each EI assembly that executes in the EI framework. After the specific EI report criteria has identified, data that meets the EI report criteria can be extracted (816) from the EI data repository (824). For example, if it is determined that only output values for processes should be included in an EI report (822), only data that includes the output values for all processes that were executed as part of an assembly that executed in the EI framework will be retrieved from the EI data repository (824) and all other data contained in the EI data repository (824) will not be extracted as it does not meet the EI report criteria.

The example method of FIG. 8 also includes assembling (818), by an EI report generator (804), the EI report information (802) into an EI report (822). In the example of FIG. 8, the EI report information (802) can be assembled (818) into an EI report (822), for example, by populating a predefined report format for the EI report (822) with the information extracted (816) from the EI data repository (242).

The example method of FIG. 8 also includes presenting (820) the EI report (822) to an EI administrator (238). In the example method of FIG. 8, presenting (820) the EI report (822) to an EI administrator (238) can be carried out, for example, by displaying the EI report (822) in a user interface to the EI framework, by sending the report as an email attachment in a message sent to the EI administrator (238), and in other ways as will occur to those of skill in the art.

The steps described in FIG. 8 may be carried out in real-time responsive to receiving a request for an EI report (822). The request for an EI report (822) may be initiated, for example, by an EI administrator (238), by another user, in response to the occurrence of some reporting initiating event, and so on. Alternatively, the steps described in FIG. 8 may be carried out periodically at a predefined interval. For example, the EI report generator (804) may be configured to generate reports at a predefined interval as part of a reporting schedule by initiating (805) EI reporting at a predetermined interval.

The example method of FIG. 8 also includes storing (821) the EI report (822) in an EI report repository (824). In the example method of FIG. 8, the EI report repository (824) may be embodied as a database or other persistent data storage mechanism for storing EI reports (822). The EI report repository (824) may therefore be utilized by an EI administrator (238) to gather a historical log of information related to the execution of EI assemblies in the EI framework.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should be also noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
analyzing, by an assembly engine that is automated computing machinery executing on a computer processor and configured to analyze a plurality of computer program modules, wherein the computer program modules are stored in a non-transitory computer readable storage medium, wherein the analyzing comprises:
   determining, dependent on one or more functionality requirements, one or more computer processes to perform for each of the plurality of computer program modules, wherein each computer program module is configured to carry out a business capability upon execution;
scheduling, by the assembly engine, execution of the one or more computer processes to perform for the computer program modules based upon the analyzing, wherein the scheduling comprises:
   receiving, during the scheduling, one or more additional computer program modules; and
   dynamically scheduling execution of the one or more additional computer program modules by scheduling the one or more additional computer program modules without halting execution of any other computer program module and without deviating from a scheduling plan; and
reporting, by the assembly engine, information related to execution of the one or more of the computer program modules.

2. The method of claim 1 wherein scheduling execution of one or more of the computer program modules further comprises:
detecting, in real time, an event; and
responsive to the detected event, executing one or more of the computer program modules.

3. The method of claim 1 wherein each computer program module further comprises one or more processes ordered in accordance with a specified sequence, each process comprising one or more tasks, each task comprising one or more steps.

4. The method of claim 1 wherein the information related to execution of the one or more computer program modules includes output generated from executing the one or more computer program modules.

5. The method of claim 1 further comprising storing the information related to execution of the one or more computer program modules in an data repository.

6. An apparatus comprising a computer processor and a non-transitory computer memory operatively coupled to the computer processor, wherein the non-transitory computer memory stores computer program instructions that, when executed, cause the apparatus to carry out the steps of:
analyzing, by an assembly engine, a plurality of computer program modules to identify computing resources necessary to execute each of the plurality of computer program modules, wherein each computer program module is configured to carry out a business capability upon execution;
scheduling, by the assembly engine, execution of one or more of the computer program modules based upon the analyzing, wherein the scheduling comprises:
   receiving, during the scheduling, one or more additional computer program modules; and
   dynamically scheduling execution of the one or more additional computer program modules by scheduling the one or more additional computer program modules without halting execution of any other computer program module and without deviating from a scheduling plan;

determining one or more differences between an execution state of a computer program module and one or more ranges of values specified to be acceptable ranges of values for execution of the computer program module;

determining an correction plan dependent upon the one or more differences between the execution state of the computer program module and the one or more ranges of values; and reporting, by the assembly engine, information related to execution of the one or more of the computer program modules.

7. The apparatus of claim 6 wherein scheduling execution of one or more of the computer program modules further comprises:

detecting, in real time, an event; and responsive to the detected event, executing one or more of the computer program modules.

8. The apparatus of claim 6 wherein each computer program module further comprises one or more processes ordered in accordance with a specified sequence, each process comprising one or more tasks, each task comprising one or more steps.

9. The apparatus of claim 6 wherein the information related to execution of the one or more computer program modules includes output generated from executing the one or more computer program modules.

10. The apparatus of claim 6 further comprising computer program instructions that, when executed, cause the apparatus to carry out the step of storing the information related to execution of the one or more computer program modules in an data repository.

11. A non-transitory computer program product disposed upon a non-transitory computer readable storage medium, the computer program product comprising computer program instructions that, when executed by a computer, cause the computer to carry out the steps of:

determining, dependent on one or more functionality requirements, one or more computer processes to perform for each of the plurality of computer program modules, wherein each computer program module is configured to carry out a business capability upon execution;

scheduling, by the assembly engine, execution of the one or more of the computer program modules based upon the determining, comprising:

receiving, during the scheduling, one or more additional computer program modules; and dynamically scheduling execution of the one or more additional computer program modules by scheduling the one or more additional computer program modules without halting execution of any other computer program module and without deviating from a choreography plan; and reporting, by the assembly engine, information related to execution of the one or more of the computer program modules.

12. The non-transitory computer program product of claim 11 wherein choreographing execution of one or more of the computer program modules further comprises:

detecting, in real time, an event; and responsive to the detected event, executing one or more of the computer program modules.

13. The non-transitory computer program product of claim 11 wherein each computer program module further comprises one or more processes ordered in accordance with a specified sequence, each process comprising one or more tasks, each task comprising one or more steps.

14. The non-transitory computer program product of claim 11 wherein the information related to execution of the one or more computer program modules includes output generated from executing the one or more computer program modules.

15. The non-transitory computer program product of claim 11 further comprising computer program instructions that, when executed by a computer, cause the computer to carry out the step of storing the information related to execution of the one or more computer program modules in an data repository.

* * * * *